US012363621B2

(12) United States Patent
Cui et al.

(10) Patent No.: US 12,363,621 B2
(45) Date of Patent: *Jul. 15, 2025

(54) ENHANCEMENT FOR SMTC CONFIGURATION FOR NEW RADIO

(71) Applicant: Apple Inc., Cupertino, CA (US)

(72) Inventors: Jie Cui, San Jose, CA (US); Yang Tang, San Jose, CA (US); Hua Li, Beijing (CN); Manasa Raghavan, Sunnyvale, CA (US); Yuhan Zhou, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,267

(22) Filed: Jan. 12, 2024

(65) Prior Publication Data

US 2024/0155471 A1 May 9, 2024

Related U.S. Application Data

(63) Continuation of application No. 17/250,648, filed as application No. PCT/US2019/047022 on Aug. 19, 2019, now Pat. No. 11,930,443.

(60) Provisional application No. 62/765,196, filed on Aug. 20, 2018.

(51) Int. Cl.
*H04W 4/00* (2018.01)
*H04W 48/16* (2009.01)
*H04W 88/08* (2009.01)

(52) U.S. Cl.
CPC ........... *H04W 48/16* (2013.01); *H04W 88/08* (2013.01)

(58) Field of Classification Search
CPC .................................................... H04W 48/16
USPC ........................................................ 370/328
See application file for complete search history.

*Primary Examiner* — Temica M Beamer
(74) *Attorney, Agent, or Firm* — Fay Kaplun & Marcin, LLP

(57) ABSTRACT

An apparatus of a next generation Node B (gNB) comprises one or more baseband processors to generate an indication for a user equipment (UE) to indicate which synchronization signal block (SSB) based measurement timing configuration (SMTC) occasion can be used by the UE for one or more measurements, and to send the indication to the UE. The apparatus can include a memory to store the indication.

17 Claims, 5 Drawing Sheets

ENHANCEMENT FOR SMTC CONFIGURATION FOR NEW RADIO

CROSS-REFERENCE TO RELATED APPLICATIONS

The present application claims the benefit of U.S. Provisional Application No. 62/765,196 (AB4431-Z) filed Aug. 20, 2018. Said Application No. 62/765,196 is hereby incorporated herein by reference in its entirety.

BACKGROUND

In the New Radio (NR) system, the synchronization signal block (SSB) based measurement timing configuration (SMTC) pattern is used to configure a user equipment (UE) to conduct the measurement for reference signal, for example SSB, but if on intra-frequency layer different SSB periodicities are used by different cells, on some of the SMTC occasions the UE might be not able to see all the SSBs of cells.

If the SSB periodicity of Cell 1/2/3/4 is 40 milliseconds (ms) and SMTC periodicity is 10 ms, the SMTC occasions or windows can cover all the SSBs from cell 1/2/3/4, but in one certain SMTC occasion, only one SSB can be covered. Since the UE has no information about which SSB can be observed in which SMTC occasion, it may cause some problems for UE implementation, for example physical layer filtering for measurement.

DESCRIPTION OF THE DRAWING FIGURES

Claimed subject matter is particularly pointed out and distinctly claimed in the concluding portion of the specification. Such subject matter may be understood by reference to the following detailed description when read with the accompanying drawings in which:

Figure 1:
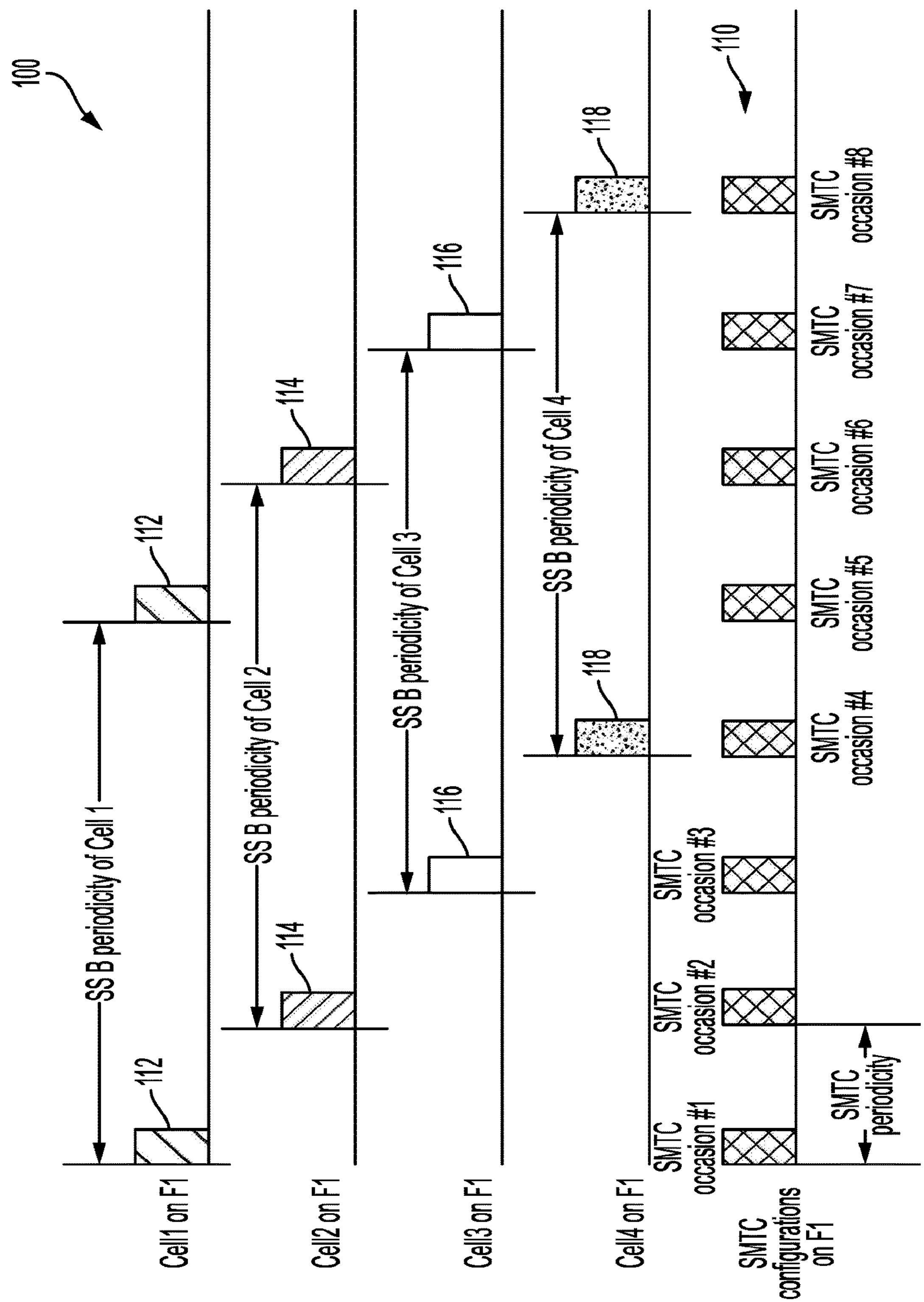
FIG. 1 is a diagram of an example SMTC configuration showing SMTC occasions in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an example SMTC configuration showing SMTC occasions in accordance with one or more embodiments will be discussed. In the SMTC configuration 100 of FIG. 1, an indication mechanism can be used to indicate which of the SMTC occasions 110, such as SMTC occasion #1 through SMTC occasion #8, can be used for a corresponding cell measurement, synchronization signal block (SSB) measurement, or channel state information reference signal (CSI-RS) measurement. For example, a bitmap can be signaled associated with a specific cell, SSB, or CSI-RS to the user equipment (UE).

As shown in FIG. 1, the SSB of frequency F1 for Cell 1 can be measured in SMTC occasion #1 and SMTC #5 only corresponding to SSB 112, so the network can indicate this time information to the UE. In or more embodiments, the indication from the network can be transmitted from a Fifth Generation (5G) or next generation NodeB (gNB) to the UE. Such an indication from the network can be carried by a bitmap. For example, in FIG. 1 the bitmap for Cell 1 measurement could be "10001000" which means SSB or CSI-RS from Cell 1 can be covered by SMTC occasion #1 and SMTC occasion #5. The bitmap of SMTC for Cell 2 measurement can be "01000100" for SMTC occasion #2 and SMTC occasion #6 corresponding to SSB 114. The bitmap of SMTC for the Cell 3 measurement can be 00100010" for SMTC occasion #3 and SMTC occasion #7 corresponding to SSB 116. The bitmap of SMTC for the Cell 4 measurement can be "00010001" for SMTC occasion #4 and SMTC occasion #8 corresponding to SSB 118.

Figure 2:
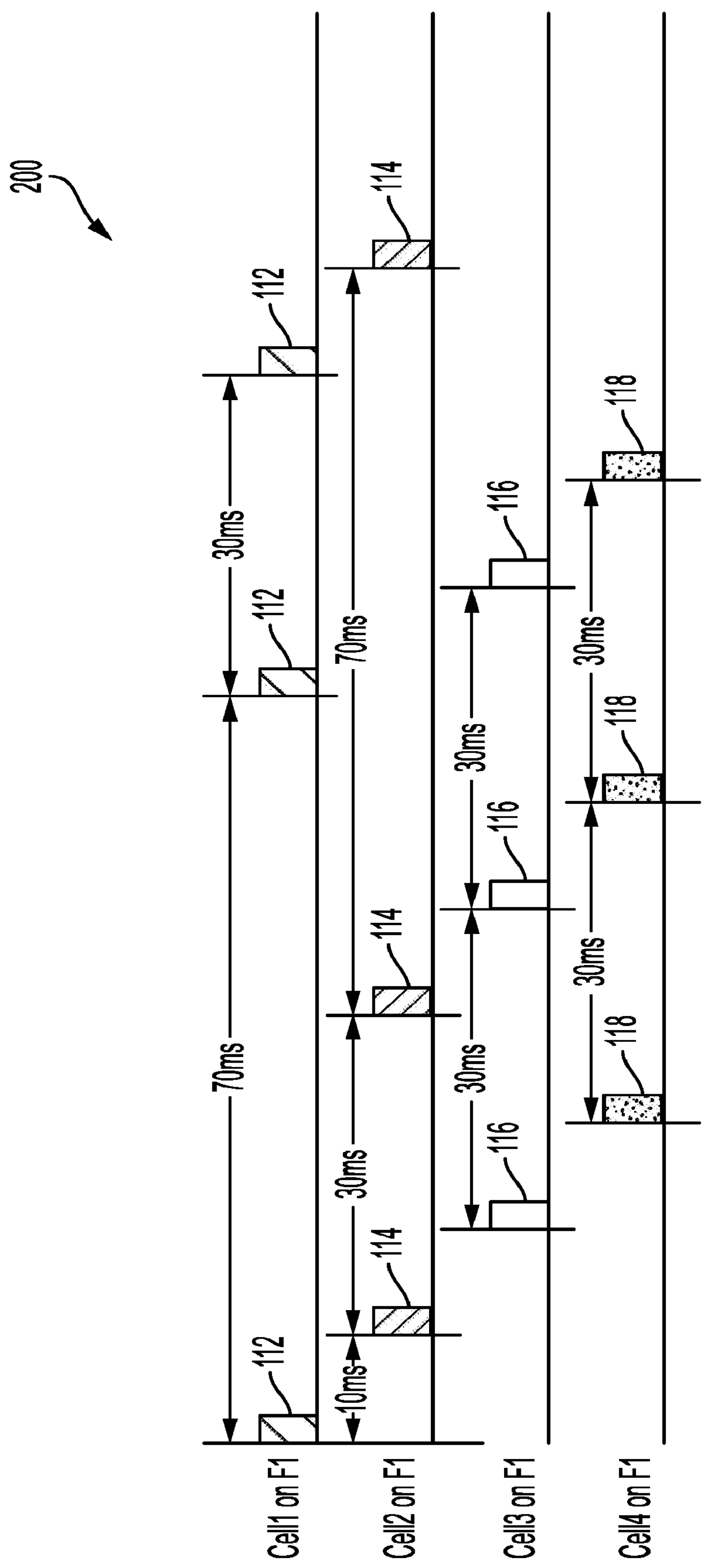
FIG. 2 is a diagram of an example of an SMTC configuration with unfixed RS periodicity for cells in accordance with one or more embodiments.

FIG. 2 is a diagram of an example of an SMTC configuration with unfixed RS periodicity for cells in accordance with one or more embodiments. In the SMTC configuration 200, for measurement gap based measurement, the network can configure a different time interval between any two reference signals (RSs), for example SSB signals, for one specific cell. In such arrangement, the periodicity of RS is not fixed for one specific cell. In one or more embodiments, the time interval can be configured by the network wherein a gNB of the network can transmit a configuration message to the UE to configure the time interval between RSs.

As shown in FIG. 2, in the first 40 ms period, the order of reference signals (RS) for cells is RS 112 from cell 1 to RS 114 from cell 2 to RS 116 from cell 3 to RS 118 from cell 4. In the second 40 ms period, the order of reference signals for cells are RS 114 from cell 2 to RS 116 from cell 3 to RS 118 from cell 4 to RS 112 from cell 1. Thus, the periodicity of RS for one given cell is not fixed. Under this configuration, the existing measurement gap repetition periodicity (MGRP), for example 20 ms, 40 ms, 80 ms, or 160 ms, can be used to cover all the RS signals from all the cells on the same frequency.

Figure 3:
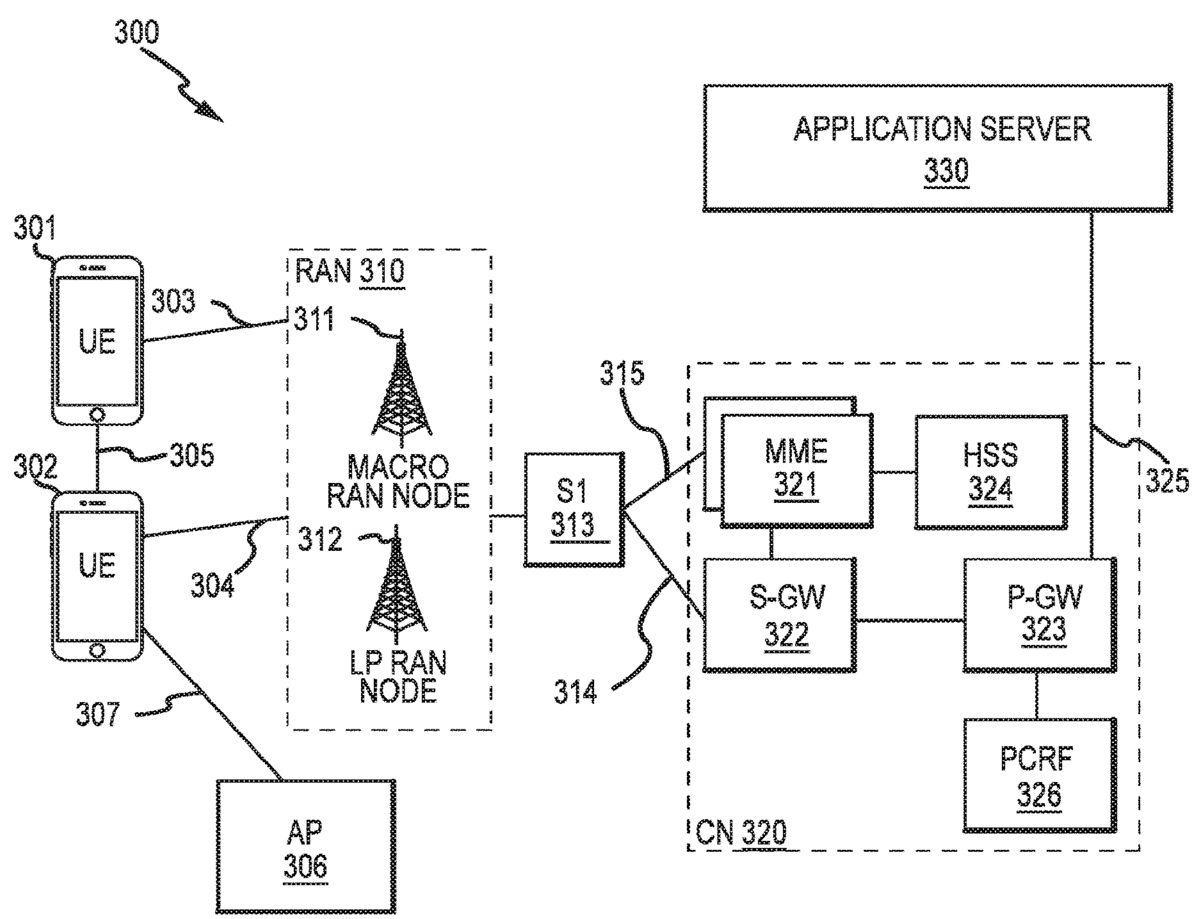
FIG. 3 illustrates an architecture of a system of a network in accordance with some embodiments.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
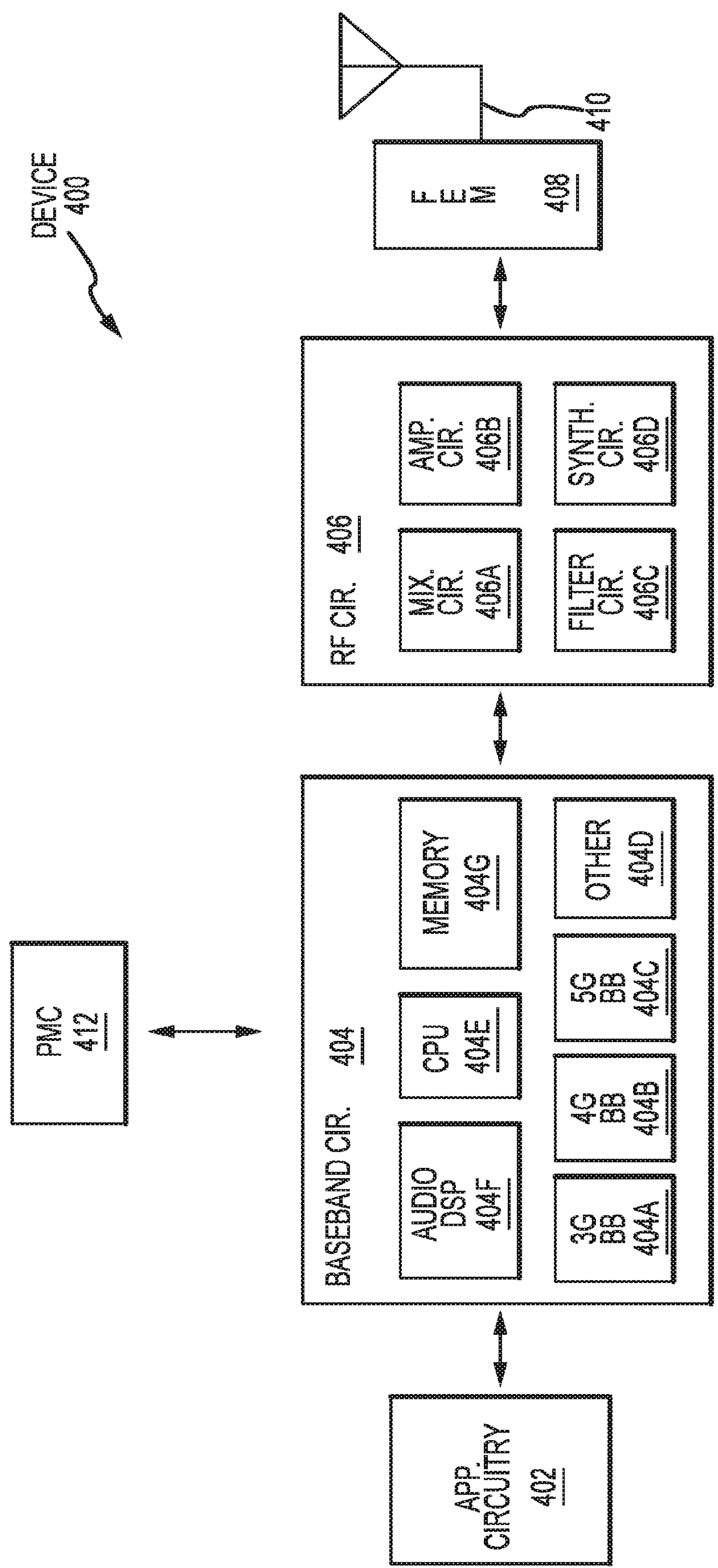
FIG. 4 illustrates example components of a device 400 in accordance with some embodiments.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406*a*, amplifier circuitry 406*b* and filter circuitry 406*c*. In some embodiments, the transmit signal path of the RF circuitry 406 may include filter circuitry 406*c* and mixer circuitry 406*a*. RF circuitry 406 may also include synthesizer circuitry 406*d* for synthesizing a frequency for use by the mixer circuitry 406*a* of the receive signal path and the transmit signal path. In some embodiments, the mixer circuitry 406*a* of the receive signal path may be configured to down-convert RF signals received from the FEM circuitry 408 based on the synthesized frequency provided by synthesizer circuitry 406*d*. The amplifier circuitry 406*b* may be configured to amplify the down-converted signals and the filter circuitry 406*c* may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406*a* of the receive signal path may comprise passive mixers, although the scope of the embodiments is not limited in this respect.

In some embodiments, the mixer circuitry 406*a* of the transmit signal path may be configured to up-convert input baseband signals based on the synthesized frequency provided by the synthesizer circuitry 406*d* to generate RF output signals for the FEM circuitry 408. The baseband signals may be provided by the baseband circuitry 404 and may be filtered by filter circuitry 406*c*.

In some embodiments, the mixer circuitry 406*a* of the receive signal path and the mixer circuitry 406*a* of the transmit signal path may include two or more mixers and may be arranged for quadrature downconversion and upconversion, respectively. In some embodiments, the mixer circuitry 406*a* of the receive signal path and the mixer circuitry 406*a* of the transmit signal path may include two or more mixers and may be arranged for image rejection (e.g., Hartley image rejection). In some embodiments, the mixer circuitry 406*a* of the receive signal path and the mixer circuitry 406*a* may be arranged for direct downconversion and direct upconversion, respectively. In some embodiments, the mixer circuitry 406*a* of the receive signal path and the mixer circuitry 406*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406*d* may be a fractional-N synthesizer or a fractional N/N+1 synthesizer, although the scope of the embodiments is not limited in this respect as other types of frequency synthesizers may be suitable. For example, synthesizer circuitry 406*d* may be a delta-sigma synthesizer, a frequency multiplier, or a synthesizer comprising a phase-locked loop with a frequency divider.

The synthesizer circuitry 406*d* may be configured to synthesize an output frequency for use by the mixer circuitry 406*a* of the RF circuitry 406 based on a frequency input and a divider control input. In some embodiments, the synthesizer circuitry 406*d* may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406*d* of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. However, in other embodiments, the PMC 4 12 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
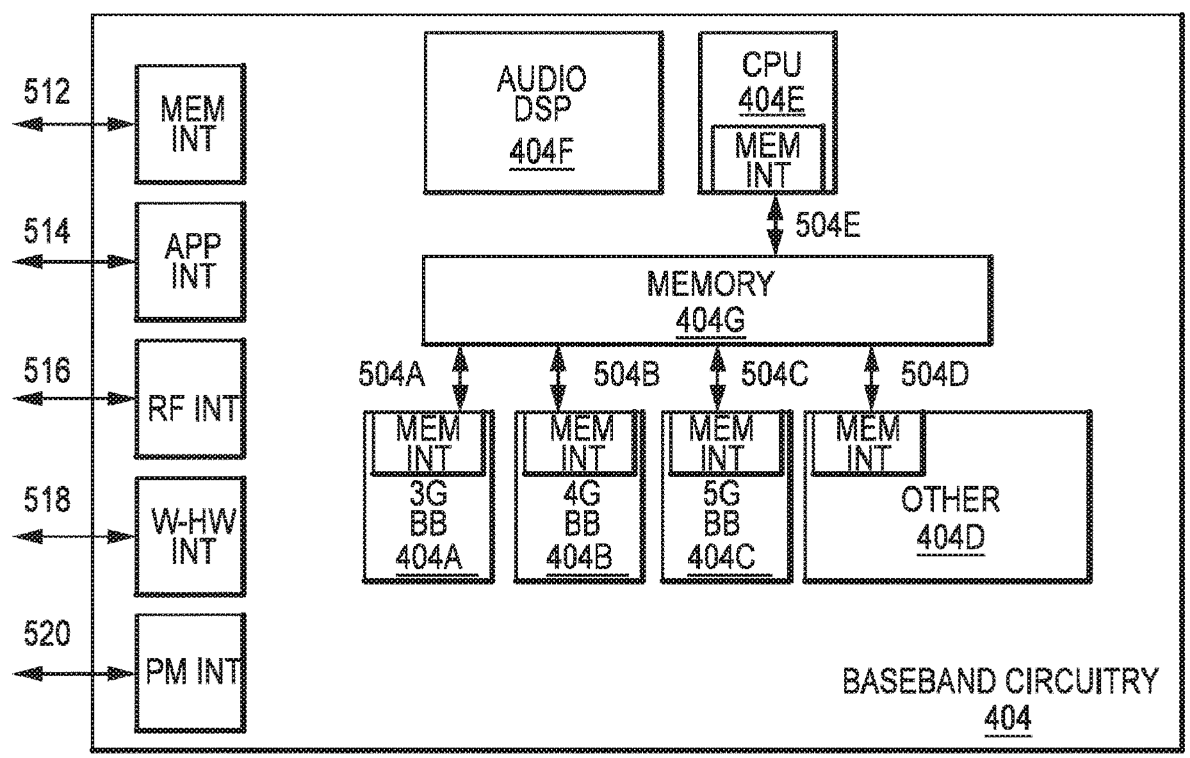
FIG. 5 illustrates example interfaces of baseband circuitry in accordance with some embodiments.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

The following are example implementations of the subject matter described herein. In example one, an apparatus of a next generation Node B (gNB) comprises one or more baseband processors to generate an indication for a user equipment (UE) to indicate which synchronization signal block (SSB) based measurement timing configuration (SMTC) occasion can be used by the UE for one or more measurements, and to send the indication to the UE, and a memory to store the indication. Example two can include the subject matter of example one or any of the examples described herein, wherein the indication comprises a bitmap associated with a specific cell. Example three can include the subject matter of example one or any of the examples described herein, wherein the indication comprises a bitmap associated with a specific SSB. Example four can include the subject matter of example one or any of the examples described herein, wherein the indication comprises a bitmap associated with a specific channel state information reference signal. Example five can include the subject matter of example one or any of the examples described herein, further comprising a radio-frequency (RF) transceiver to transmit the indication to the UE.

In example six, apparatus of a next generation Node B (gNB) comprises one or more baseband processors to generate a configuration of a selected time interval between reference signals for an identified cell for measurement gap based measurement for a user equipment (UE), and to send the configuration to the UE, and a memory to store the configuration. Example seven can include the subject matter of example six or any of the examples described herein, wherein a periodicity between the reference signals is not fixed for the identified cell. Example eight can include the subject matter of example six or any of the examples described herein, wherein the reference signals comprise synchronization signal block (SSB) signals. Example nine can include the subject matter of example six or any of the examples described herein, wherein the reference signals comprise channel state information reference signals (CSI-RS). Example twelve can include the subject matter of example six or any of the examples described herein, further comprising a radio-frequency (RF) transceiver to transmit the indication to the UE.

In example eleven, one or more storage media having instructions stored thereon that, when executed by an apparatus of a next generation Node B (gNB), result in generating an indication for a user equipment (UE) to indicate which synchronization signal block (SSB) based measurement timing configuration (SMTC) occasion can be used by the UE for one or more measurements, and sending the indication to the UE. Example twelve can include the subject matter of example eleven or any of the examples described herein, wherein the indication comprises a bitmap associated with a specific cell. Example thirteen can include the subject matter of example eleven or any of the examples described herein, wherein the indication comprises a bitmap associated with a specific SSB. Example fourteen can include the subject matter of example eleven or any of the examples described herein, wherein the indication comprises a bitmap associated with a specific channel state information reference signal.

In example fifteen, one or more storage media having instructions stored thereon that, when executed by an apparatus of a next generation Node B (gNB), result in generating a configuration of a selected time interval between reference signals for an identified cell for measurement gap based measurement for a user equipment (UE), and sending the configuration to the UE. Example sixteen can include the subject matter of example fifteen or any of the examples described herein, wherein a periodicity between the reference signals is not fixed for the identified cell. Example seventeen can include the subject matter of example fifteen or any of the examples described herein, wherein the reference signals comprise synchronization signal block (SSB) signals. Example eighteen can include the subject matter of example fifteen or any of the examples described herein, wherein the reference signals comprise channel state information reference signals (CSI-RS).

Although the claimed subject matter has been described with a certain degree of particularity, it should be recognized that elements thereof may be altered by persons skilled in the art without departing from the spirit and/or scope of claimed subject matter. It is believed that the subject matter pertaining to enhancement for SMTC configuration for new radio and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus comprising processing circuitry configured to:

receive an indication comprising a first set of one or more synchronization signal block (SSB) based measurement timing configuration (SMTC) occasions to be used for one or more measurements on a first cell and a second set one or more SMTC occasions to be used for one or more measurements on a second cell, wherein the indication further comprises a specific identity of the first cell and a specific identity of the second cell; and perform the one or more measurements on the first cell and second cell.

2. The apparatus of claim 1, wherein the processing circuitry is further configured to:

report measurement results to a network.

3. The apparatus of claim 1, wherein the indication comprises a first bitmap associated with the specific identity of the first cell and a second bitmap associated with the specific identity of the second cell.

4. The apparatus of claim 1, wherein the indication comprises a bitmap associated with a specific SSB.

5. The apparatus of claim 1, wherein the indication comprises a bitmap associated with a specific channel state information reference signal.

6. The apparatus of claim 1, wherein the apparatus is included as a component of a user equipment (UE).

7. One or more non-transitory storage media having instructions stored thereon that, when executed by a processor, result in:

receiving an indication comprising a first set of one or more synchronization signal block (SSB) based measurement timing configuration (SMTC) occasions to be used for one or more measurements on a first cell and a second set one or more SMTC occasions to be used for one or more measurements on a second cell, wherein the indication further comprises a specific identity of the first cell and a specific identity of the second cell; and performing the one or more measurements on the first cell and second cell.

8. The one or more non-transitory storage media of claim 7, wherein the instructions further result in:

reporting measurement results to a network.

9. The one or more non-transitory storage media of claim 7, wherein the indication comprises a first bitmap associated with the specific identity of the first cell and a second bitmap associated with the specific identity of the second cell.

10. The one or more non-transitory storage media of claim 7, wherein the indication comprises a bitmap associated with a specific SSB.

11. The one or more non-transitory storage media of claim 7, wherein the indication comprises a bitmap associated with a specific channel state information reference signal.

12. The one or more non-transitory storage media of claim 7, wherein the one or more non-transitory storage media is included as a component of a user equipment (UE).

13. A user equipment (UE), comprising:

radio frequency circuitry configured to communicate with a network; and one or more baseband processors communicatively coupled to the radio frequency circuitry and configured to perform operations comprising:

receiving an indication comprising a first set of one or more synchronization signal block (SSB) based measurement timing configuration (SMTC) occasions to be used for one or more measurements on a first cell and a second set one or more SMTC occasions to be used for one or more measurements on a second cell, wherein the indication further comprises a specific identity of the first cell and a specific identity of the second cell; and performing the one or more measurements on the first cell and second cell.

14. The UE of claim 13, wherein the operation further comprise:

reporting measurement results to a network.

15. The UE of claim 13, wherein the indication comprises a first bitmap associated with the specific identity of the first cell and a second bitmap associated with the specific identity of the second cell.

16. The UE of claim 13, wherein the indication comprises a bitmap associated with a specific SSB.

17. The UE of claim 13, wherein the indication comprises a bitmap associated with a specific channel state information reference signal.

* * * * *